Jan. 14, 1930.   W. M. JENKINS   1,743,455
FISHING TOOL
Filed April 27, 1927

INVENTOR
William M. Jenkins
By Hazard and Miller
ATTORNEY

Patented Jan. 14, 1930

1,743,455

UNITED STATES PATENT OFFICE

WILLIAM M. JENKINS, OF FULLERTON, CALIFORNIA

FISHING TOOL

Application filed April 27, 1927. Serial No. 186,903.

My invention is a fishing tool for recovering sucker rods or the like in well, such as oil well, pumping.

An object of my invention is the construction of a fishing tool which will allow passage therethrough of part of a broken sucker rod and having means to engage such rod below a coupling, a connection, or some other enlargement of the rod.

A further object of my invention is in a fishing tool, designed to fish sucker rods, having a set of jaws arranged in a triangular manner, each jaw being pivotally mounted at one end to tilt upwardly on the passage of the sucker rod or a coupling or connection of such rod passing upwardly in relation to the fishing tool and the jaws swinging downwardly to engage underneath such enlargement.

My fishing tool employs a lower tubular section having a lateral passage at the side and secured at the top to a cable, the lateral passage allowing the upper end of a broken sucker rod to pass through the fishing tool. At the lower part of the tool I have preferably three jaws arranged to form a triangle, each jaw being pivoted at one end and tilting upwardly to allow passage of the sucker rod and any of its connectors, there being slots or grooves in the tubular part of the fishing tool to allow movement of these jaws, and when the tool is drawn upwardly in relation to the sucker rod being fished, the jaws swing down and engage underneath a connector, thus allowing lifting of the sucker rod.

My invention is illustrated in the accompanying drawings, in which.

Figure 1:
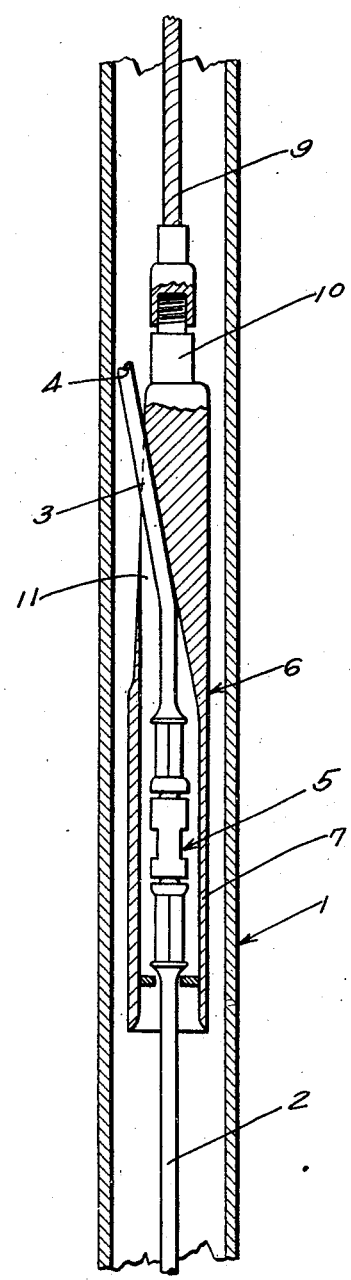
Figure 1 is a vertical section through an oil pipe or the like showing my fishing tool in longitudinal section with a sucker rod being fished.

In the drawings an oil pipe string or the like is designated by the numeral 1, in which the sucker rod 2 operates, this rod being indicated as having an upper section 3 broken as indicated at 4. The sections of the rod, being made in suitable lengths, have a standard coupling or connector designated generally by the numeral 5. It is underneath such coupling or connector or other equivalent enlargements of the sucker rod that my fishing tool is adapted to engage and thus allow lifting of the rod.

The fishing tool, designated generally by the numeral 6, has a lower tubular section 7 and a solid upper body or head 8 to which is attached a cable 9 by a standard connection 10. The upper body or head has a lateral opening 11 through which the sucker rod may pass in order that the cylindrical part may extend upwardly a sufficient extent to allow gripping of a coupling or connector.

Figure 2:
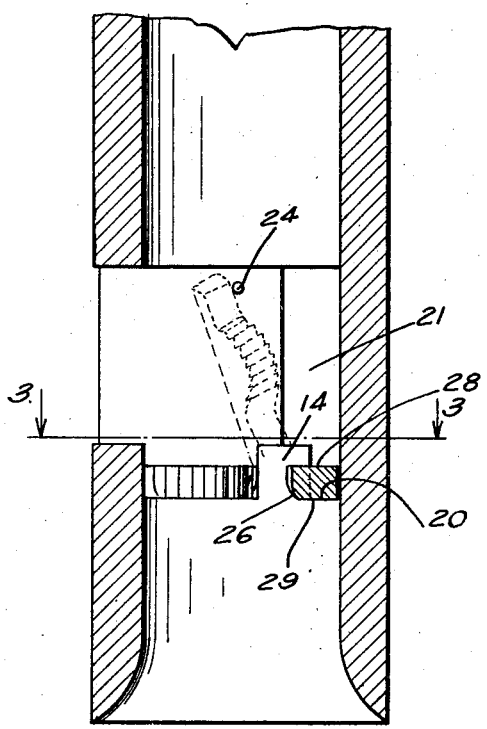
Figure 2 is a short vertical section on the line 2—2 of Fig. 3 in the direction of the arrows.
Figure 3:
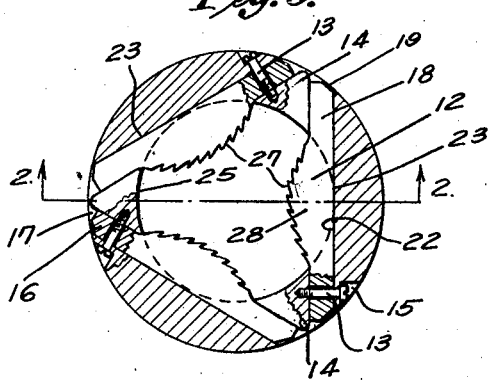
Figure 3 is a horizontal section on the line 3—3 of Fig. 2 in the direction of the arrows.

Adjacent the lower end of the tubular section there are preferably formed three jaws 12, these being similar, and each jaw being mounted on a pivot pin 13, such pin being threaded into a small triangular stud 14, which is only of sufficient height to provide metal for the pivoting, and having the head in a countersunk recess 15. The pivoted end 16 of each jaw is mounted in a vertical groove or slot 17 formed in the tubular part of the fishing tool. The free end 18 of each jaw fits into a slot or groove 19 resting on a shoulder 20. These grooves or slots 17 and 19 on each side of the triangular stud 14 merge into a large slot 21 which extends sufficiently high to allow a swinging movement of the jaws upwardly, as shown in Fig. 2.

The inside parts of the tubular section 7, adjacent the jaws, are formed with flat vertical backing walls 22, against which the rear surface 23 of the jaws may slide or bear in their movement of pivoting upwardly and downwardly. It is preferable to have a stop pin 24 secured in each of these flat walls in order to restrict the upward movement of the jaws so that they will not be forced back of the center and therefore allowing such jaws to swing downwardly by their own weight after passing over a connector. It will be noted that the inside surface 25 of the studs 14 is curved conforming to the internal diameter of the tubular part of the fishing tool.

Each jaw is formed with a convex and slightly outwardly inclined inside face 26 and has a plurality of gripping teeth 27, these teeth being inclined and being adapted to form gripping jaws to hold a tool and allow unthreading. The jaws are thus of greater width on the top surface 28 than on the lower surface 29.

The manner of operation of my fishing tool is substantially as follows:

The tool is lowered by a cable 9 and passes over the upper end or broken section of a fish, such as a sucker rod, and as the connector 5 engages the jaws 12 these are pivoted upwardly as shown in dotted lines in Fig. 2, such action allowing the connector or other enlargement of the sucker rod or fish to pass through such jaws. In such action if the upper part of the sucker rod is long, it is bent slightly sideways, as shown in Fig. 1. When the jaws have passed the connector or enlargement they drop downwardly by gravity, becoming seated on the shoulders 20 and being held firmly in the short slots 17 and 19 between the studs 14 and the adjacent portion of the tubular part of the fish. The flat surfaces 22 form a bearing for the jaws in their swinging movement up and down. Thus it will be seen that when the jaws drop downwardly the opening between same is too small to allow the downward passage of the connector when the fish is drawn upwardly and thus the fish is elevated by means of the cable.

When the fish is drawn to the surface the lifting action causes the teeth to grip tightly into the fish and the fishing tool may then be used as a wrench to turn the sucker rod to unscrew such rod at one of the couplings or connectors.

A characteristic feature of my invention is that the gripping jaws swing on horizontal pivots and their plane of movement is a vertical plane parallel to the axis of the lower tubular section 7, and also that these jaws have a firm backing support by the flat vertical surfaces 23 of this lower tubular section. Therefore, if there is any outward wedging action of a sucker rod or the like, this outward pressure is resisted by these vertical surfaces of the hollow tubular section.

Another characteristic feature of my fishing tool is that in the position for supporting a sucker rod or the like, each jaw is supported at its opposite ends. Therefore, there is no tendency to break or shear the pivot.

It will thus be seen that I have developed a simple form of fish which, while being especially designed to engage and lift broken sucker rods, may be utilized for fishing other rods of a similar character having connectors or other enlargements on which the jaws may engage.

Various changes may be made in the principles of my invention without departing from the spirit thereof, as set forth in the description, drawings and claims.

I claim:

1. A fishing tool having a lower tubular section with a plurality of jaws, each jaw pivotally mounted at one of its ends and each jaw swinging upwardly in a vertical plane parallel to the axis of the tubular section, means in the tubular section to support the free ends of each jaw with the main portion of the jaws normally occupying substantially a horizontal position, the tubular section having flat surfaces behind and outside of each jaw forming a backing therefor in the swinging movement of said jaws upwardly, the jaws when in an upper position allowing passing of the tubular section over an enlarged part of the fish, and when in a horizontal position engaging an enlargement of a fish.

2. A fishing tool having a lower tubular section with three vertical slots, a stud at the base of each slot forming two short slots on each side of the stud, three jaws, the tubular section having flat vertical faces at the back of each jaw, the jaws being arranged to form substantially an equilateral triangle, each jaw having one end pivoted on a pivot pin between the tubular section and a stud in one of the short slots, the other end of each jaw fitting in the short slot adjacent another stud, each jaw swinging in a vertical plane, and in the horizontal position being supported by the pivot pins and a horizontal shoulder at the base of one of the short slots, the jaws in an upper position allowing passing of an enlargement of a fish and in their horizontal position engaging such enlargement.

3. A fishing tool comprising in combination a body structure having a lower tubular section, a cable connected to the upper part of the body, a lateral opening from the tubular section to one side of the upper part of the body, the lower tubular section having three vertical slots, each slot having a horizontal shoulder, three jaws mounted on pivot pins, the free end of each jaw being adapted to rest on a shoulder in a horizontal plane, the jaws swinging in a vertical plane, the back of each jaw bearing against a flat vertical surface on the tubular section and the slots, the jaws being greater width at the top than at the bottom, and in their upper position allowing passing over an enlargement of a fish and in their lower horizontal position engaging such enlargement, each jaw having a single gripping side, such side being substantially at right angles to the pivot of the jaw and the flat internal faces of the tubular body taking the outward side thrust of said jaws.

4. A fishing tool having a lower tubular section with three flat internal faces positioned to form sides of an equilateral triangle, three jaws each having an end pivoted adjacent the side edges of each of the flat surfaces, the tubular section on the opposite sides of each of the flat surfaces having an abutting face to support the free end of each of the jaws, each of such jaws swinging in a vertical plane parallel to the axis of the tubular section to allow passage of an enlargement of a fish and in their horizontal position to engage such enlargement and support the fish, each jaw having a single gripping side, such side being substantially at right angles to the pivot of the jaw and the flat internal faces of the tubular body taking the outward side thrust of said jaws.

5. A fishing tool having a lower tubular section with a portion having three internal flat walls forming substantially a triangular-shaped interior of said tubular section, three jaws each mounted on a pivot and swinging in a vertical plane, the back of each jaw bearing against one of the said flat surfaces, and means to support the free end of each jaw in a horizontal line with its pivot.

6. A fishing tool having a lower tubular section with three flat interior faces, said faces forming substantially a triangle, a groove at each corner of said triangle, a jaw pivotally mounted on a horizontal pivot in each groove, each jaw swinging in a vertical plane and having its back against one of the flat faces, and means to support the free end of each of the jaws, the said flat faces supporting the outward thrust of the said jaws when supporting a fish.

7. A fishing tool having a lower tubular section with three flat interior faces forming substantially a triangle in cross-section of said section, a plurality of grooves at each of the corners of the triangle with a stud between each of the grooves, three jaws each having an end mounted on a pivot secured between the tubular section and one of the said studs and having its free end rest in a slot adjacent another stud, each of the jaws bearing against one of the flat faces, said faces taking the outward thrust of the jaws when supporting a fish.

8. In a fishing tool, a tubular body, a plurality of grooves in the bore of said body, a horizontal pivot pin rigid with the body and extending into each of said grooves in a plane parallel to and spaced from the axis of the body, said pins being disposed in a common horizontal plane and in angularity with each other, and a jaw mounted upon each pin for pivotal movement in a plane spaced from the axis of the body.

9. In a fishing tool, a tubular body, a plurality of grooves in the bore of said body, a horizontal pivot pin rigid with the body and extending into each of said grooves in a plane parallel to and spaced from the axis of the body, said pins being disposed in a common horizontal plane and in angularity with each other, and a jaw mounted upon each pin for pivotal movement in a plane spaced from the axis of the body, the free end of each jaw resting, when horizontally disposed, upon the bottom of the groove associated with another of said jaws.

10. In a fishing tool, a tubular body, a plurality of grooves in the bore of said body, a horizontal pivot pin rigid with the body and extending into each of said grooves in a plane parallel to and spaced from the axis of the body, said pins being disposed in a common horizontal plane and in angularity with each other, and a jaw mounted upon each pin for pivotal movement in a plane spaced from the axis of the body, the inner face of each jaw being convex.

11. In a fishing tool, a tubular body, a plurality of grooves in the bore of said body, a horizontal pivot pin rigid with the body and extending into each of said grooves in a plane parallel to and spaced from the axis of the body, said pins being disposed in a common horizontal plane and in angularity with each other, and a jaw mounted upon each pin for pivotal movement in a plane spaced from the axis of the body, the inner face of each jaw being convex, and the free end of each jaw resting, when horizontally disposed, upon the bottom of the groove associated with another of said jaws.

12. In a fishing tool, a tubular body, a plurality of grooves in the bore of said body, a horizontal pivot pin rigid with the body and extending into each of said grooves in a plane parallel to and spaced from the axis of the body, said pins being disposed in a common horizontal plane and in angularity with each other, and a jaw mounted upon each pin for pivotal movement in a plane spaced from the axis of the body, the inner face of each jaw being convex and inclined, and the free end of each jaw resting, when horizontally disposed, upon the bottom of the groove associated with another of said jaws.

In testimony whereof I have signed my name to this specification.

W. M. JENKINS.